Aug. 25, 1970    G. W. GOETZ    3,525,501
PALLET TRUCK ASSISTING MEANS
Filed May 17, 1968    3 Sheets-Sheet 1
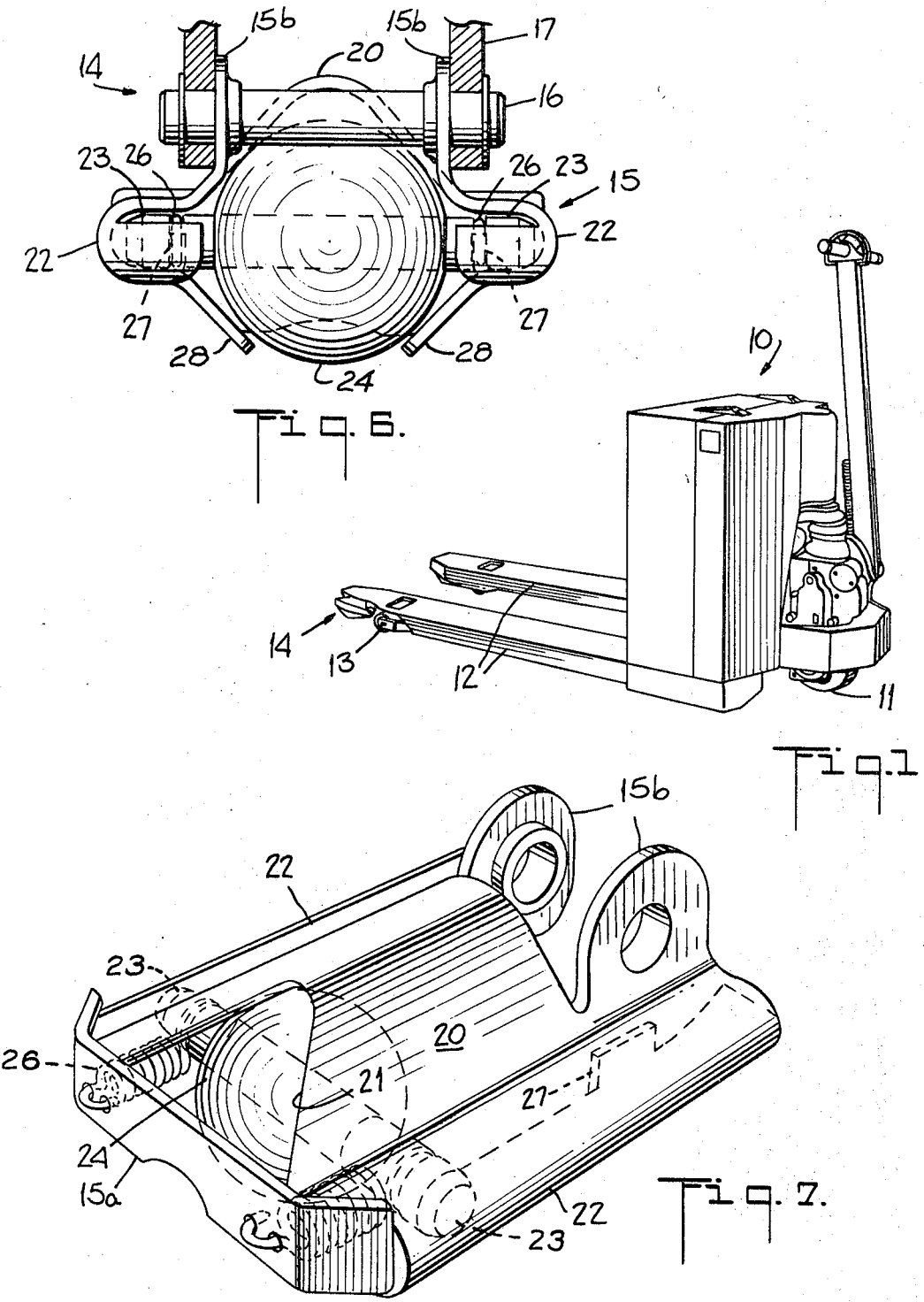
INVENTOR.
G. W. GOETZ
BY
*Jennings & Laddy*
ATTORNEYS

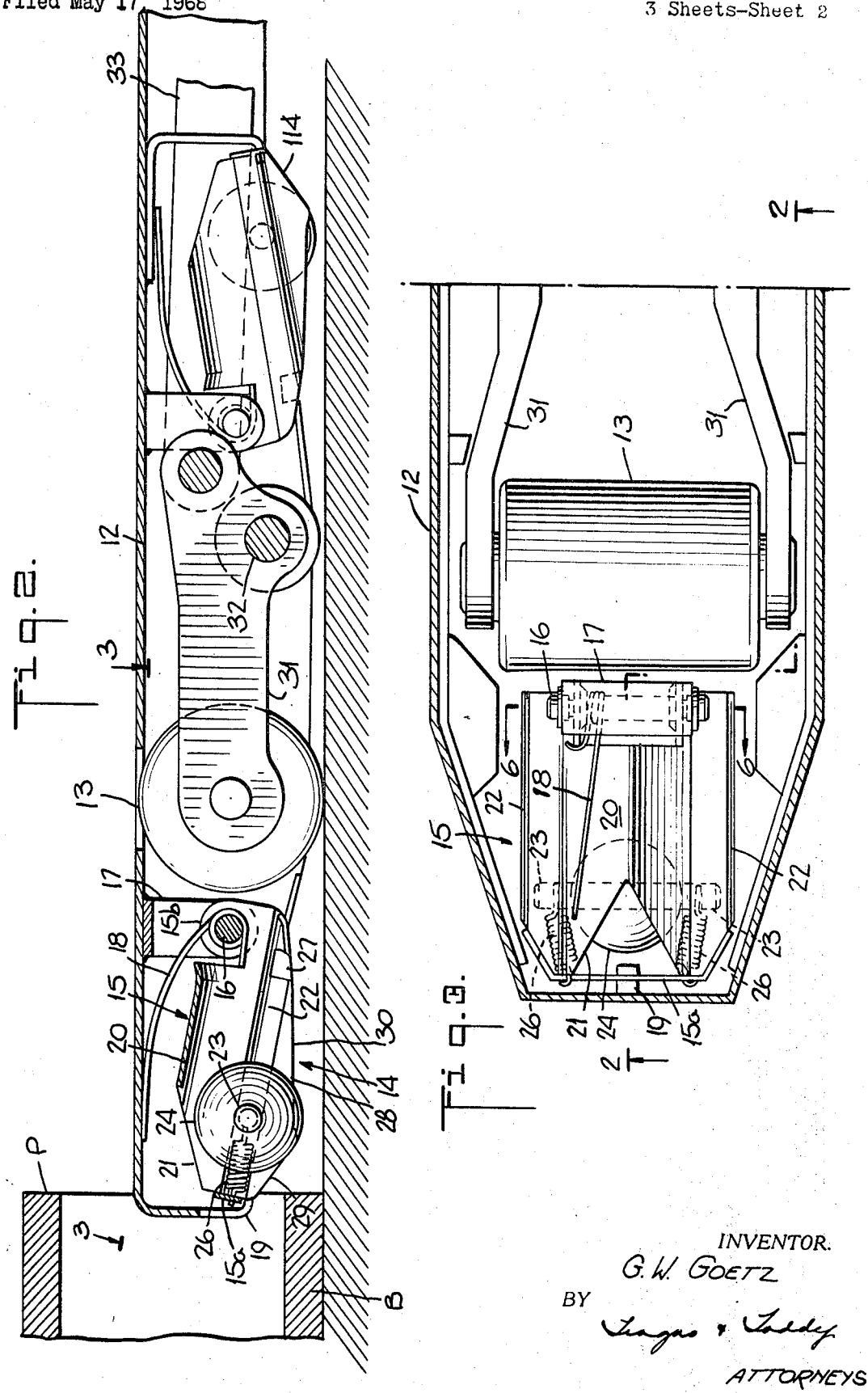

Aug. 25, 1970 G. W. GOETZ 3,525,501
PALLET TRUCK ASSISTING MEANS
Filed May 17, 1968 3 Sheets-Sheet 3
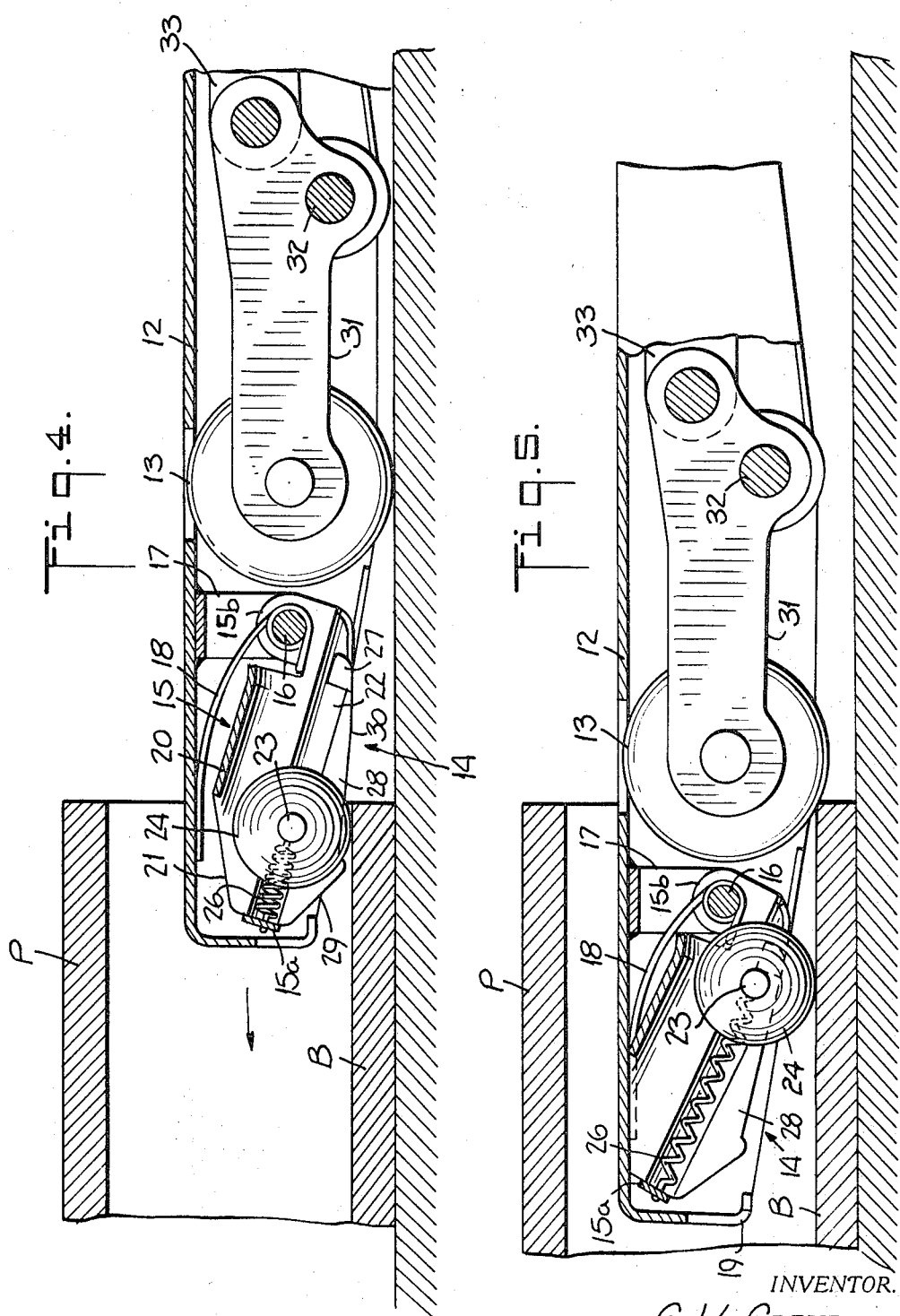
INVENTOR.
G. W. GOETZ
BY
Traynor & Toddy
ATTORNEYS

# United States Patent Office 3,525,501
Patented Aug. 25, 1970

3,525,501
PALLET TRUCK ASSISTING MEANS
George W. Goetz, Detroit, Mich., assignor to Eaton Yale
& Towne Inc., Cleveland, Ohio, a corporation of Ohio
Filed May 17, 1968, Ser. No. 730,127
Int. Cl. B60p 1/00
U.S. Cl. 254—2
14 Claims

ABSTRACT OF THE DISCLOSURE

The load platform of a pallet truck is equipped with a ball-shaped roller mounted on a lever that can pivot upwardly so that the roller can easily ride onto the lower floor boards of a pallet, without pushing the pallet ahead. The lever has an inclined surface on which the upper periphery of the roller rolls rearwardly while the lower periphery rolls forwardly on the pallet boards, first causing the lever to pivot farther upward to a limit position, and thereafter pressing the pallet against the ground while lifting the load platform and its lifting wheels to a position enabling the wheels to move easily onto the pallet boards.

---

This invention relates to industrial trucks of the type that is utilized for handling pallets, and more particularly to a novel construction that will better enable a pallet truck to engage a pallet.

A pallet, in a form that is most widely used, comprises upper and lower floor boards that are spaced about four inches apart. A pallet truck has a load platform that is supported at one end by load wheels that are quite small so that the load platform, together with the wheels, may enter between the upper and the lower floor boards and move inwardly of the pallet. The lower floor boards of the pallet form openings through which the load wheels may move into contact with the floor on which the pallet rests. The truck has suitable lifting means that will move the load wheels downwardly relatively to the truck platform so as to lift the platform, thereby lifting the pallet on the platform. The lifting is made possible because, as indicated, the load wheels are in contact with the floor through the openings in the lower floor of the pallet.

Because the load wheels of the truck are small, due to the limitations imposed by the spacing of the upper and lower floor boards of the pallet, it is difficult to move these wheels over the first of the lower boards. Where the pallet is heavily loaded, the load wheels generally will bounce over the first floor board and into the pallet, but when the pallet has no load, it very frequently will be pushed along the floor by contact with the wheels and the wheels will not enter the pallet. A truck attempting to leave an unloaded pallet will tend to pull the pallet with it.

The prior art actually shows many atempts that have been made to facilitate the movement of a pallet truck into and out of a pallet. It has been proposed to use entry assisting rollers, various discs mounted in angular positions, and even presser means for pressing a pallet against the floor. However, none of the earlier proposals has proven fully satisfactory and the problem has remained substantially unsolved, so far as I am aware.

In this application I set forth novel pallet truck assisting construction that I believe is an excellent answer to the problem, and actual tests have shown my construction to be extremely effective.

My invention comprises a small roller that is mounted in advance of the lifting wheels on the load platform of a pallet truck, and that will easily yield in an upward direction when first engaging the lower floor boards of a pallet, enabling the roller to roll onto the floor boards with little tendency to push the pallet ahead of the truck, and including means whereby the roller later moves downwardly so as to press the pallet against the ground while lifting the load platform.

As a feature of my invention, I mount the small roller for movement in a downward and rearward direction relatively to the truck load platform when lifting the load platform relatively to the pallet. In a preferred form of my invention, the roller is a ball having trunnions that will move in angular guideways on the load platform, this movement in the guideways being contributed by contact of the ball with a pallet as the truck starts to enter the pallet.

Even more particularly, I prefer to form the guideways on a pivoting lever, the lever being spring pressed in a direction to bring the roller or ball against the pallet floor so that the roller or ball will move in a direction for elevating the load platform. Preferably also, I utilize springs for holding the preferred ball in an initial position, the ball moving against the force of the springs, as will be appreciated.

As will appear most clearly from a reading of the specification, the ball, which is in itself a considerable contribution to the art, will move bodily with the lever supporting it, and into contact with a floor board as the truck moves toward the pallet. The ball then will roll on the first board while moving angularly on the lever so as to pivot the lever to an upper limit position. Continued angular movement of the ball on the lever will contribute very smooth lifting movement to the load platform of the truck and brings its load wheels to the upper surface of the floor board.

Those skilled in the art will understand that my invention may also be utilized to assist the movement of a pallet truck when it is to leave a pallet.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

Referring now to the drawings:

FIG. 1 shows a pallet truck utilizing my novel pallet truck assisting means.

FIG. 2 shows my assisting means in more detail, and is in part a section on the broken line 2—2 of FIG. 3.

FIG. 3 substantially shows a section on the line 3—3 of FIG. 2.

FIGS. 4 and 5 show views somewhat like FIG. 2 but with parts in different positions to illustrate the operation of my invention.

FIG. 6 shows an end view on the line 6—6 in FIG. 3.

FIG. 7 shows a perspective view.

For the purpose of describing my invention, I show in FIG. 1 a usual type of pallet truck 10 having a forward steering wheel 11 and a pair of rearwardly extending legs 12 equipped with small lifting wheels 13. The legs 12 form a low lying load platform that is adapted to enter a pallet and to lift the pallet when wheels 13 are extended downwardly, all as will be familiar to those skilled in the art. I show a portion of one truck leg 12 broken away in FIG. 1 in order that the leg may be seen equipped with my novel truck assisting means 14, and it is to be understood that the other of the legs 12 is similarly equipped.

Referring now to FIGS. 2 and 3 of the drawings, my novel assisting means 14 include a lever 15 arranged in a longitudinal position that will be in advance of the lifting wheel 13 as the truck leg 12 moves toward a pallet P. I shall term that movement of leg 12 a forward movement, since it is the pallet engaging movement with which we are concerned. The lever 15 is mounted at its rearward end on a pivot pin 16 that is supported in a transverse position near the lifting wheel 13 on truck leg 12, there being a bracket 17 for that purpose. A coil spring 18 is assembled on the pivot pin 16 with its opposed ends extended to act between surfaces on the lever 15 and the leg 12 so as to press lever 15 in a downward direction about pivot pin 16. While applying a certain pressure, the spring 18 will easily yield when the truck leg 12 applies its weight to lever 15, as I shall explain in due course. The forward end of leg 12 has a stop portion 19 that will engage a crosspiece 15a on lever 15 so as to limit downward movements of the lever to a normal angular position which is shown in FIG. 2.

The lever 15 may very well be formed from sheet metal material, with a pair of mounting portions 15b engaging the pivot pin 16, and comprises a longitudinal top portion 20 in the shape of an inverted channel. It will be seen that the channel or portion 20 extends in an angular downward and rearward direction toward lifting wheel 13. As best shown in FIG. 6, the channel 20 in the form that I prefer is substantially V-shaped. A cut-away end portion 21 on channel 20 allows clearance for a movement of lever 15 about its pivot to an upper limit position, FIG. 5, where cut-away portion 21 is against an inner surface on the truck leg 12.

Below the top channel portion 20, the lever 15 is shaped with opposed side channels 22 parallel to channel portion 20, and forming guideways for trunnions 23 on a ball-shaped roller 24. I show roller 24 formed with a plain surface, but roller 24 may have a serrated surface to increase its surface friction, as may be preferred by some users. There are coil springs 26 engaged at their opposed ends in openings of cross piece 15a and in grooves formed in trunnions 23 whereby to press the roller 24 normally to an initial forward position which is shown in FIGS. 2, 3, and 7. The springs 26 act with relatively light pressure and will yield to permit roller 24 to move rather easily in the rearward direction. Lever 15 is formed with small stop flanges 27 that will engage the trunnions 23 to limit rearward movement of the roller 24 to the position shown in FIG. 5.

To explain further the relationship between the lever 15 and roller 24, I shall refer to FIG. 6 of the drawings. It will first be seen that the upper periphery of roller 24 engages the inner surface of the channel portion 20. When channel portion 20 is a V, as I show and prefer, roller 24 will have merely two points of contact with portion 20. Further, I arrange a small clearance between the trunnions 23 and the guideways 22. Thus, when rolling in a forward direction on a supporting surface such as a pallet board, roller 24 also will roll rearwardly on the lower surface of the top channel portion 20, while trunnions 23 may move with relative freedom along guideways 22.

When the roller 24 is a ball as I do prefer, the V-shaped top channel 20 on lever 15 will effectively guide its movements and relatively little guidance need be offered by the guideways 22. However, the guideways do hold ball 24 assembled to lever 15 and will help to guide the ball under some conditions that the truck may encounter. It is conceivable, of course, that some persons may design my construction so as to utilize a roller that is cylindrical, or with a more or less rounded surface, and therefore, I do not wish in all cases to be limited by a ball.

As FIG. 6 shows, I prefer to form the lower portion of lever 15 with guard flanges 28 that are inclined toward the roller 24. FIG. 2 shows that each guard flange 28 has an inclined advance edge 29 that is substantially in aligned relation to the lower periphery of roller 24 when the roller is in its normal FIG. 2 position. Further, a lower edge 30 then is somewhat above the lower periphery of the roller.

I believe that it will be unnecessary to describe the details of operating means for the lifting wheel 13, because persons who are skilled in the pallet truck art will know how to construct means for that purpose. It will suffice if I merely refer to FIG. 2, where I show lifting wheel 13 mounted on a bell crank lever 31 that is supported through a shaft 32 on the truck leg 12, and that will be rotated by a push rod 33 so as to extend the wheel 13 downwardly, lifting the truck leg 12.

I have described my assisting means 14 arranged in advance of the lifting wheel 13 so as to act when truck leg 12 enters a pallet, but those skilled in the art will appreciate that a truck also may encounter some difficulty when leaving a pallet. Therefore, as shown in FIG. 2, I may equip each truck leg 12 with further assisting means 114 that will be in advance of lifting wheel 13 when the truck moves to leave the pallet. The assisting means 114 may be like the means 14 that I have described, but will be mounted in a reverse position on the leg 12.

To consider the manner in which my invention will operate let us refer first to FIG. 2 of the drawings. In that figure, we may assume that the truck leg 12 is moving toward the pallet P preparatory to engaging the pallet. The lifting wheel 13 naturally is in its retracted position with the truck platform or leg 12 lowered, and the lever 15 is in its normal spring pressed position against the stop 19. Also, the springs 26 are holding the roller 24 in its initial position near the forward end of lever 15. The lower periphery of the roller 24 then is somewhat below the level of the upper surface on the lower pallet board B, and the advance edge 29 of the lever 15 is in position for engaging the edge of the board B.

It will be remembered that the spring 18 will yield when the weight of the truck leg 12 is applied to the lever 15 and therefore the board B, by contact with the advance edge 29 of lever 15, will move the lever upwardly about its pivot 16. That will enable the roller 24 to roll easily onto the upper surface of board B, as shown in FIG. 4.

The spring 18, continuing to apply its downward pressure, will hold the channel portion 20 of the lever 15 in frictional contact with roller 24 while holding the roller also in frictional contact with the surface of the pallet board B. Therefore, as the truck moves beyond the FIG. 4 position, roller 24 will move rearwardly through yielding of the springs 26 on lever 15, while the lower periphery of roller 24 rolls forwardly on the surface of board B.

Due to the angular position of channel 20, the rearward movement of roller 24 will cause lever 15 to pivot farther upward. Sooner or later the cut-away portion 21 of lever 15 will move to limit position against the lower surface of leg 12, so that roller 24 can offer full support to the truck leg 12. While supporting truck leg 12, roller 24 will continue to move rearwardly, lifting the truck leg 12 until the lower periphery of the lifting wheel 13 is in the position shown in FIG. 5, near the level of the upper surface on pallet floor board B.

To appreciate the operation that I have described, it should be realized that there will be but little friction resisting the rolling movements of roller 24. Also, the roller springs 26 offer no great resistance to the rearward movements of roller 24. In addition, when first riding onto pallet board B, roller 24 can rather easily move against the pressure of spring 18. Therefore, roller 24 will apply very little pressure in a forward direction to the pallet P and will not push the pallet ahead of the truck. Of course, the roller 24 will increase its pressures when supporting the weight of truck leg 12, as in FIG. 5, but those pressures will act in a direction holding the pallet more firmly against the ground. With the pallet so held, and with the lifting wheel 13 in its FIG. 5 position, the wheel 13 may easily roll onto the pallet floor board B.

My construction will operate well though the thicknesses of pallet boards may vary. Thus, referring to FIG. 2, the board B may be thicker or thinner, and my assisting means will operate effectively so long as the edge of the board will engage some point on the advance edge 29 or on roller 24.

I believe that the construction and the operation of my novel pallet truck assisting means now will be understood. Through the concept of my invention, I enable a pallet truck actually to move without fail into pallet lifting position without first moving the pallet along the floor, and without need for any additional means or procedure to hold the pallet while the truck moves to engage the pallet. In fact, tests were made using a pallet that was supported on a surface having a very low coefficient of friction, and the pallet was found to have little tendency to move while being engaged by the truck. I believe, therefore, that those skilled in the art will fully appreciate the very considerable merits of my invention.

I now claim:

1. In a pallet truck of the type having a low lying load platform with small load lifting wheels under the platform, and which wheels are required to ride over floor boards of a pallet into a position for lifting the pallet thereafter, with pallet entering assisting means carried under said low lying load platform for contacting the pallet before said lifting wheels strike the floor boards of the pallet, the improved pallet entering assisting means comprising a small roller for contacting said pallet boards in advance of the lifting wheels, means mounting said roller for yielding in an upward direction relatively to the load platform so as to move with relative ease onto the pallet boards while the platform moves into the pallet, and means acting incidental to farther inward movement of the platform to effect positive downward movement of said roller so that it will lift said platform.

2. In the combination set forth in claim 1, the feature that the means that move the roller downwardly comprise a member mounted on the load platform for movement relatively to the roller, said member having an angular surface through which it acts to move the roller.

3. In the combination set forth in claim 1, the feature that said roller is a ball.

4. In a pallet truck of the type having a low lying load platform with small load lifting wheels under the platform, and which wheels are required to ride over floor boards of a pallet into a position for lifting the pallet thereafter, with pallet entering assisting means carried under said low lying load platform for contacting the pallet before said lifting wheels strike the floor boards of the pallet, the improved pallet entering assisting means comprising a roller for contacting said pallet boards in spaced relation to said load lifting wheels, means mounting said roller for bodily movement relatively to the load platform, the lower periphery of said roller being somewhat above the lower periphery of the load lifting wheels so that said roller may more easily roll onto the pallet boards, and including a surface on which the upper periphery of said roller moves in a direction toward the load wheels incidental to movement of the platform into the pallet.

5. In the combination of claim 4, the feature that an inverted channel contributes the surface on which the upper periphery of the roller moves.

6. In the combination of claim 5, the feature that the roller is a ball, and said inverted channel having a V-shape offering two lines of contact along which the ball will roll.

7. In a pallet truck of the type having a low lying load platform with small load lifting wheels under the platform, and which wheels are required to ride over floor boards of a pallet into a position for lifting the pallet thereafter, with pallet entering assisting means carried under said low lying load platform for contacting the pallet before said lifting wheels strike the floor boards of the pallet, the improved pallet entering assisting means comprising a roller for contacting said pallet boards in spaced relation to said load lifting wheels, and adapted to roll on said boards, and means mounting said roller for linear movement relatively to said load platform in a direction inclined downwardly toward said load wheels, said roller when rolling in contact with the boards moving downwardly on its mounting while moving with said load platform in a direction inwardly of said pallet.

8. In the combination of claim 7, the feature that said roller is equipped with opposed trunnions, and the roller mounting including angular guideways engaging said trunnions.

9. In the combination of claim 8, the feature that said roller is in the form of a ball.

10. In the combination of claim 7, the feature that said roller mounting means on which the roller moves linearly toward the load wheels includes a lever pivoted to said platform, and a spring pressing said lever downwardly to urge the roller toward the pallet floor boards.

11. In the combination of claim 7, the feature that the mounting of the roller includes an inverted channel on which the upper periphery of the roller will roll while the roller moves linearly toward the load wheels.

12. In the combination of claim 11, the feature that a lever is pivoted to said platform and forms said inverted channel.

13. In the combination of claim 12, the feature that said lever is mounted at one end through a pivot on the underside of said load platform, said pivot being positioned between the roller and the load wheels, and there being stop means limiting the movement of said lever upwardly about said pivot relatively to said load platform.

14. The combination of claim 13, in which said roller is a ball equipped with opposed trunnions, said lever being formed with guideways along which said trunnions will move while the roller moves toward the load wheels, and including a spring acting against the lever to press the ball downwardly against the pallet.

References Cited

UNITED STATES PATENTS

| | | | |
|---|---|---|---|
| 2,615,677 | 10/1952 | Quayle | 254—2 |
| 2,921,771 | 1/1960 | Emary | 254—2 |
| 2,993,703 | 7/1961 | Paradise | 254—2 X |

ROBERT C. RIORDON, Primary Examiner

D. R. MELTON, Assistant Examiner

U.S. Cl. X.R.

280—43.12